US009119056B2

United States Patent
Hourani et al.

(10) Patent No.: US 9,119,056 B2
(45) Date of Patent: Aug. 25, 2015

(54) CONTEXT-DRIVEN APPLICATION INFORMATION ACCESS AND KNOWLEDGE SHARING

(71) Applicants: Mark Hourani, Los Gatos, CA (US); Richard Hong, San Jose, CA (US)

(72) Inventors: Mark Hourani, Los Gatos, CA (US); Richard Hong, San Jose, CA (US)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 13/887,867

(22) Filed: May 6, 2013

(65) Prior Publication Data

US 2014/0330890 A1 Nov. 6, 2014

(51) Int. Cl.
*G06F 15/16* (2006.01)
*H04W 4/20* (2009.01)

(52) U.S. Cl.
CPC .................................. *H04W 4/206* (2013.01)

(58) Field of Classification Search
USPC .................. 709/203, 201, 202, 223, 224, 217
See application file for complete search history.

(56) References Cited

U.S. PATENT DOCUMENTS

| 8,724,795 | B1* | 5/2014 | Aldrich et al. | 379/265.02 |
| 2002/0184524 | A1* | 12/2002 | Steele et al. | 713/201 |
| 2004/0054984 | A1* | 3/2004 | Chong et al. | 717/103 |
| 2013/0275392 | A1* | 10/2013 | Bhatt et al. | 707/692 |

* cited by examiner

*Primary Examiner* — Lan-Dai T Truong
(74) *Attorney, Agent, or Firm* — Schwegman Lundberg & Woessner, P.A.

(57) ABSTRACT

Example systems and methods of context-driven information access are presented. In one example, a request for information concerning an application is received from a user device employing the application. Also received from the user device is context information related to execution of the application. Based on the request and the context information, information concerning the application is retrieved. The information concerning the application is then transmitted to the user device while the user device is employing the application. In some examples, this information may also be shared among other user devices.

18 Claims, 18 Drawing Sheets

FIG. 13

SAP / SAP HANA ANSWERS AN OPEN DEVELOPER COMMUNITY [BETA]

WELCOME, JEFF ROSS (JEFF ROSS) [LOGOUT]

CAN I USE HANA AWS FOR PERSONAL TRAINING? — 1302

ASK AS QUESTION ☐ [FOLLOW] — 1312

RELATED TAGS

[ODBC] [23] [DB] [HANA] [QUESTION]
[AMAZON] [ANALYTIC VIEWS] [SQL]
[HANA ONE]

HANA OBJECT ACTIVATION ERROR
I CREATED PROJECT, XSACCESS, XSAPP, AND SOURCE — 1304
CODE FILE SAMPLEXSJS IN HANA STUDIO MODELER BUT
I ENCOUNTERED HANA OBJECT ACTIVATION ERROR

ISSUE CONTEXT: CLIENT OS = WINDOWS 7; HANA — 1306
STUDIO VERSION = 6.1; HANA SERVER REVISION = 42;

RELATED QUESTIONS

> WHY IS HANA NOT WORKING?
> HOW DO I RUN A SELECT IN HANA?
> HOW CAN I RUN A SELECT IN HANA?
> I TRY TO UNDERSTAND
> WHERE CAN I FIND DOCUMENTATION FOR HANA ONE?
> WILL HANA CHANGE THE WORLD?
> YET ANOTHER HANA QUESTION
> HANA 23 WITH LONG ENOUGH TITLE
> I WOULD LIKE TO ASK A HANA QUESTIONS
> HANA ANALYTIC VIEWS

YOUR REPLY

B I ≡ ≡ ≡ | 🖼 ∞ | & ≡ ∨

1308

SAP SUPPORT PORTAL  SAP COMMUNITY NETWORK  SAP HELP PORTAL  SAP HANA  SAP HANA COOKBOOK  SAP HANA ACADEMY  FEEDBACK
PRIVACY                TERMS OF USE              LEGAL DISCLOSURE  COPYRIGHT

CONTEXT-DRIVEN APPLICATION INFORMATION ACCESS AND KNOWLEDGE SHARING

FIELD

This application relates generally to data processing and, in an example embodiment, to providing access to information related to an application using contextual information.

BACKGROUND

Software application users often encounter issues, such as cryptic error messages, unclear interface specifications, and so on, with one or more applications they are utilizing. At times, the documentation supplied with an application, whether in hardcopy or electronic form, may be incorrect, or at least may not provide enough detail to alleviate these issues.

As a result, a user may consult any number of online, web-based sources available over the Internet, such as online user communities or chat forums associated with the application of interest, customer support websites operated by the provider of the application (e.g., support web pages providing preexisting documentation), and the like. In some situations, the user may be able to retrieve helpful information that already exists from these online resources. If such preexisting information is not available, the user may pose a question to a website, community forum, or the like, to which the initiating user hopes to receive a response from another user that helps the user solve the issue. In these examples, the other user may ask the initiating user some targeted queries to determine more about the initiating user's particular application environment. Moreover, a dialog may occur between the two users, resulting in a potential solution to the initiating user's issue.

In yet other examples, a user may call a customer support phone line operated by the provider of the application to provide information regarding the issue involved in the hope that the customer support representative may be able to provide the user some information leading to resolution of the problem.

In each of the above scenarios, resolution of the issue may require a significant amount of time and effort of the user and other parties involved.

BRIEF DESCRIPTION OF DRAWINGS

The present disclosure is illustrated by way of example and not limitation in the figures of the accompanying drawings, in which like references indicate similar elements and in which:

FIGS. 8-17 depict example screenshots of graphical user interfaces for providing context-driven application information access.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
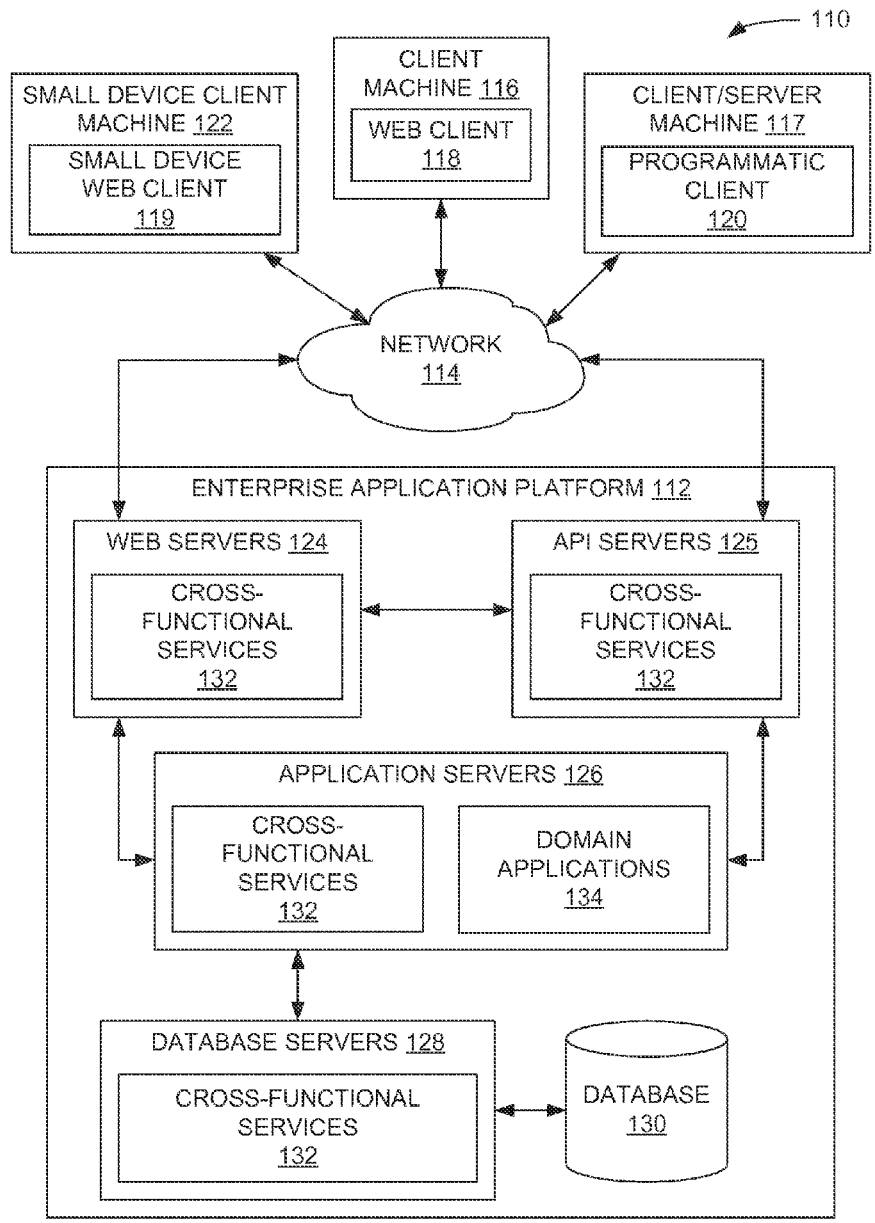
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128, which may facilitate access to one or more databases 130. The web servers 124, API servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
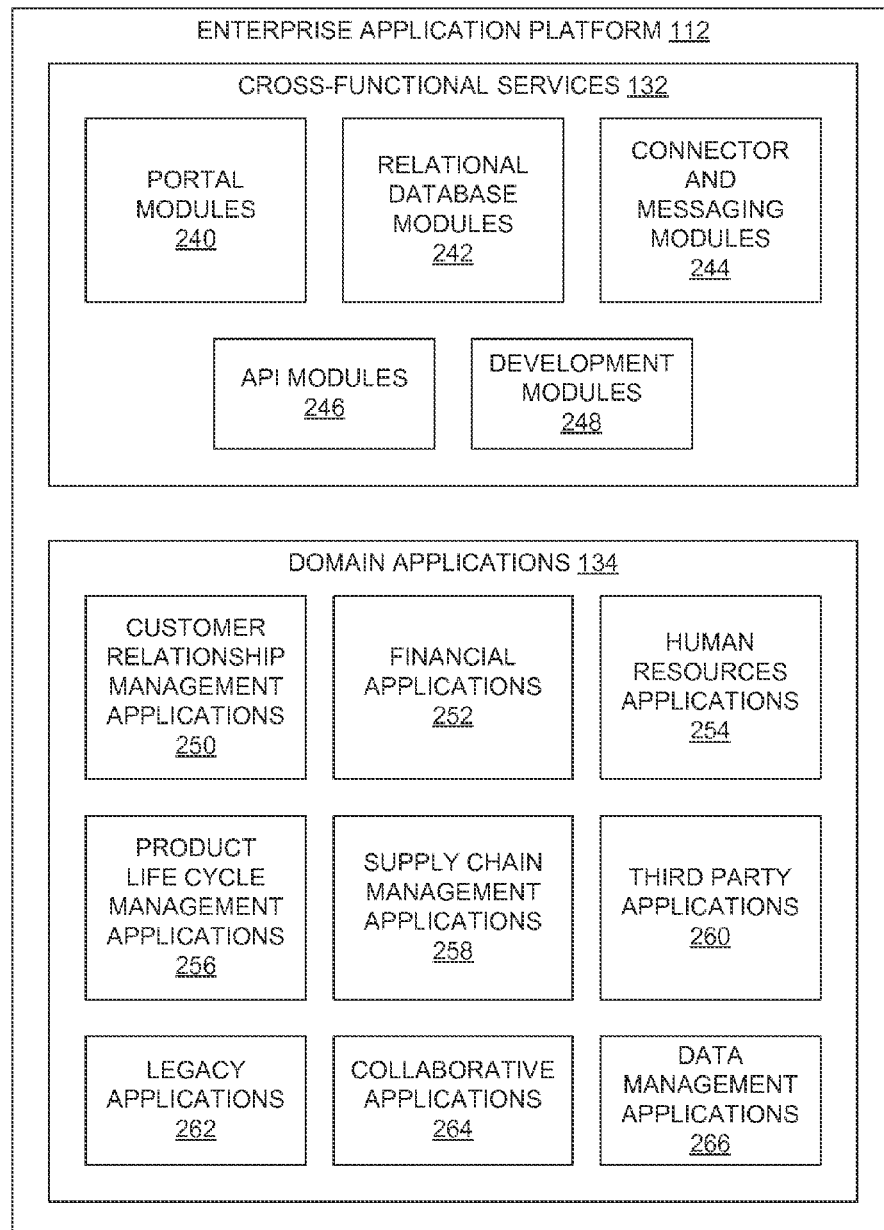
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244. API modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regeneration module. In addition, the portal modules 240 may comply with web services standards and/or utilize a variety of Internet technologies, including, but not limited to, Java®, Java 2 Platform—Enterprise Edition (J2EE), SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP). Universal Description, Discovery and Integration (UDDI), and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, Structured Query Language (SQL). SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The API modules 246 may enable the development of service-based applications by exposing an interface to existing and new applications as services. Repositories may be included in the platform 112 as a central place to find available services when building applications.

The development modules 248 may provide a development environment for the adding, integrating, updating, and extending of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel who are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
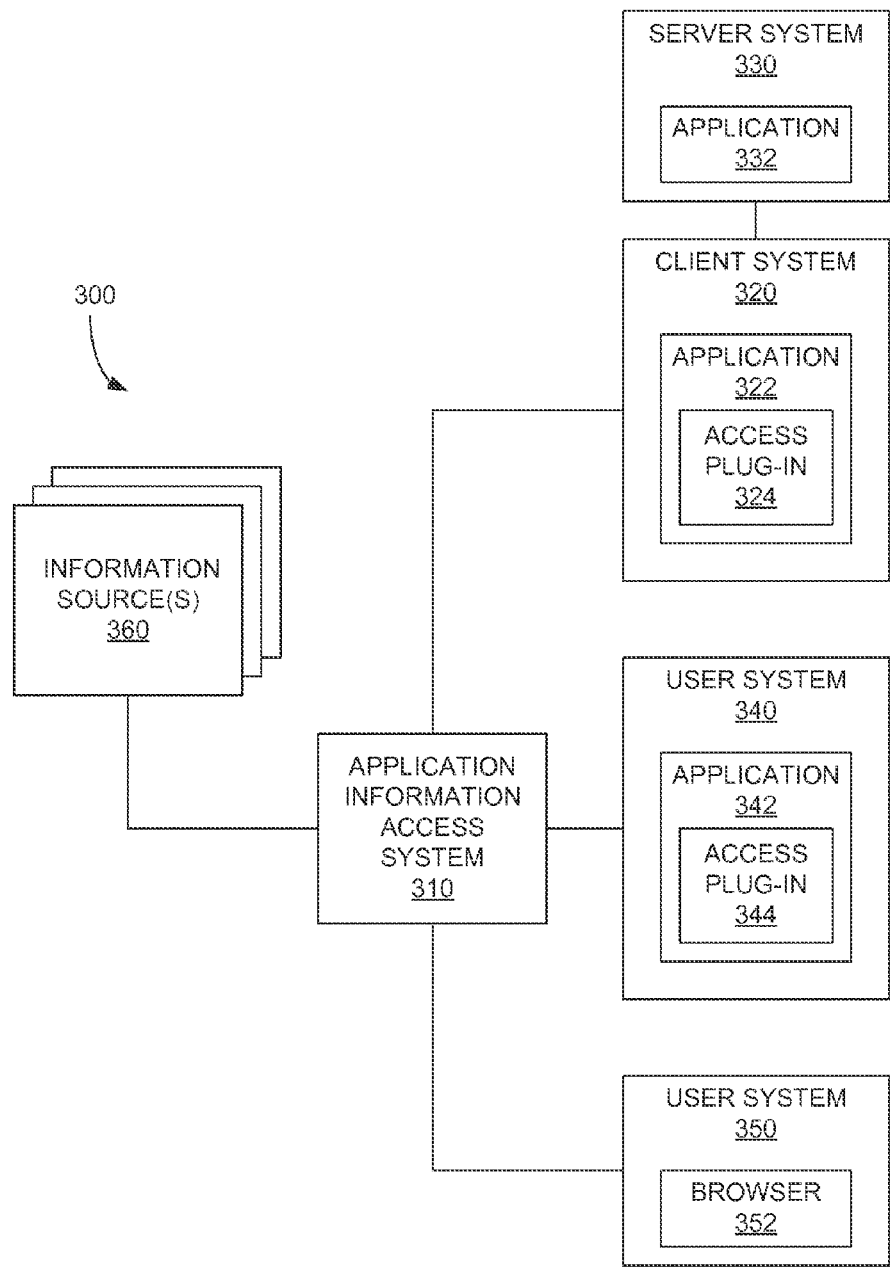
FIG. 3 is a block diagram of an example communication system.

FIG. 3 is a block diagram of a communication system 300 in which access to context-driven application information is provided. In general, one or more user systems, such as client system 320 and other user systems 340 and 350, request information concerning an application being employed by the user system from an application information access system 310. The user systems may also provide the application information access system 310 context information regarding execution of the application. In response to the request and the context information, the application information access system 310 may access one or more information sources 360 for information that most closely pertains to the request, and may return that information to the requesting user device. In other examples the application information access system 310 may forward the request to other users, which may provide the requested information in the form of an answer to the request. By employing context information, the application information access system 310 may provide more specific and pertinent information regarding the application to the user device. Other potential aspects of the communication system 300 and related embodiments are discussed in greater detail below.

The application information access system 310 may receive a request for information (e.g., a question or query) regarding an application from several different types of user systems. For example, a client system 320 may execute an application 322 residing within the client system 320, and/or may communicate with a server system 330 to execute an application 332 located thereon. In one instance, the application 322, 332 may be an editor for creating and editing software programs, a compiler/linker for compiling and linking such software, a debugger, and/or another cross-functional service 132, such as those discussed above in conjunction with FIG. 2. In some examples, the application 322, 332 may be executed within an integrated development environment (IDE) (also known as an interactive development environment) or outside an IDE. In other examples, the application 322, 332 may be an application intended for an end-user, such as a database application or business application, such as the domain applications 134 of FIG. 2 described above. However, the scope of the various embodiments described herein is not limited to a particular type of application. Further, the application 322 may include an access plug-in 324, which may be a software program that executes within the application 322 (or, similarly, within an IDE) that provides a user of the client system 320 access to the application information access system 310 for information of interest regarding the application 322, 332. As a result, in at least one example, a user of the user client system 320 may continue to employ the application 322, 332 while attempting to retrieve the information of interest.

In another example, a user system 340 or device may execute an application 342 internally without the use of a server system 330. As with the application 322 executing on the client system 320, the application 342 executing on the user system 340 may include an access plug-in 344 to facilitate communications between the application information access system 310 and a user employing the user system 340.

Further, a user system 350 may employ a browser 352, such as, for example, Internet Explorer®, by Microsoft® Corporation, to access the application information access system 310 to retrieve information regarding a particular application without currently executing that application.

Each of the client system 320 and the user systems 340, 350 may be any user device capable of communication with the application information access system 310, and possibly capable of executing an application, such as any of applications 322, 332, 342, corresponding to the information to be retrieved. Examples of such devices include, but are not limited to, personal computers (PCs), laptop computers, tablet computers, smart phones, and personal digital assistants (PDAs). In yet other implementations, the user systems 340, 350 may be embedded computing systems, such as processor-based systems embedded within special purpose devices, such as home entertainment equipment, motorized vehicles, industrial equipment, home appliances, personal communication equipment, and so on.

The application information access system 310 facilitates access to information stored in one or more information sources 360 to service the requests for information received from the client system 320, the user systems 340, 350, and any other user device or system capable of issuing such requests and receiving the corresponding information. The application information access system 310 is described in greater detail below in conjunction with FIG. 4.

Each of the one or more information sources 360 may be any device or system capable of storing and/or accessing information of interest to users of one or more applications executing on the client system 320, the user systems 340, 350, another user device or system, another data or information source, or the like. The information sources 360 may include, but are not limited to, a system hosting a user application community for a particular application or set of applications, a help or customer support system provided by a provider of an application or set of applications, and a communication system that provides educational and technical information regarding an application or set of applications. In one example, each of these systems may be accessed over a wide-area network (WAN), such as the Internet, by way of Hyper-Text Transfer Protocol (HTTP) or another communication protocol compatible with the retrieval of information pertaining to one or more applications.

In at least some implementations, one or more of the communications between the application information access system 310, the client system 320, the server system 330, the user systems 340, 350, and the information sources 360 may be coupled together via any communication means, such as, for example, the Internet or another WAN, a local-area network (LAN), a cellular communication network, or any other wired or wireless communication connection. In other examples, one or more of the systems or sources of FIG. 3 may be combined into a larger integrated system, or may be subdivided to produce more individual systems interconnected by one or more communication networks.

Figure 4:
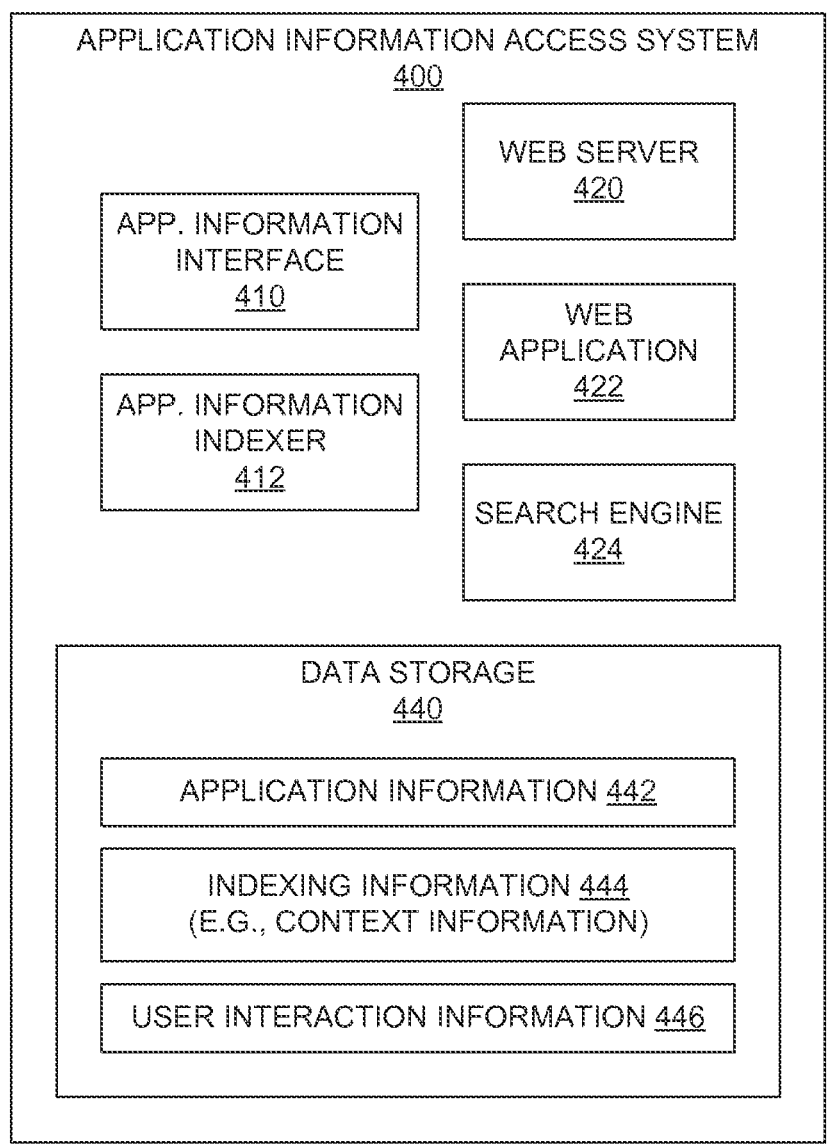
FIG. 4 is a block diagram of an example application information access system employed in the communication system of FIG. 3.

FIG. 4 is a block diagram of an example application information access system 400, which may serve as the application information access system 310 of FIG. 3. The application information access system 400 may possess modules including an application information interface 410, an application information indexer 412, a web server 420, a web application 422, a search engine 424, and data storage 440. Further, the data storage 440 may include application information 442 for one or more applications, as well as indexing information 444 (including context information), and user interaction information 446. Other conventional components that may be included in the application information access system 400, such as one or more processors, program memory, a user interface, and the like, are not depicted in FIG. 4 to focus and simplify the following discussion. Further, some modules of FIG. 4 may be combined with others, or subdivided into further modules. Additionally, some of the modules shown in the application information access system 400 may be omitted while others may be added in some implementations.

The web server 420, in combination with the web application 422, may provide a graphical user interface to a user of a communication device, such as the client system 320 and the user systems 340, 350, via an access plug-in 324, 344 or browser 352 executing thereon. Generally, the web server 420 may handle the communication protocol between the application information access system 400 and the various user systems mentioned above, as well as provide relay requests and responses between the user systems and the web application 422. Accordingly, the web application 422 may provide the specific graphical and textual elements of the user interface, and may communicate with one or more of the search engine 424, the application information interface 410, and the application information indexer 412 to process requests for information (e.g., questions regarding a particular application) in view of the context information received from the user systems.

In some implementations, the web application 422, in response to receiving a question or query, may forward the question or query to one or more other user devices coupled with the application information access system 400 to solicit one or more responses from those users, and then forward those responses to the user device originating the question or query. In some examples, the forwarding of questions or queries may occur in response to a specific user request, in response to a lack of pertinent information in the data storage 440, or in response to some other impetus.

In some examples, the web server 420 and the web application 422 may be combined into a single operational module, or organized in some other manner than that indicated in FIG. 4.

The search engine 424 may receive search queries from the web application 422 indicating the type of information being requested for a particular application, possibly along with context information indicating more specific information regarding the context in which the user is employing that application. The search engine 424 may then search the data storage 440 for such information in the application information 442, possibly aided by the indexing information 444 and/or the user interaction information 446. In some examples, the search engine 424 may also access one or more of the information sources 360 of FIG. 3 via the application information interface 410 to retrieve application information 442 in response to a particular search query.

In one example, the search engine 424 may employ a standard word matching query that matches items from the search query, such as words provided in a question, along with words represented in the context information, to retrieve the most relevant application information 442 to answer the question or query. In other implementations, the search engine 424 may employ more sophisticated techniques, such as semantic interpretation of the question or query and associated context information, weighting of various portions of the context information, utilization of user feedback in a machine learning algorithm to determine the best answers to particular questions, and so on. Other example search algorithms or techniques that may be employed in the search engine 424 may include, but are not limited to, statistical analysis, linguistic analysis, structured text search, natural language search, and other searching or ranking algorithms.

The application information interface 410 may communicate with any or all of the information sources 360 of FIG. 3 to retrieve information regarding one or more applications. In one example, the application information interface 410 may perform these communications under the control of the search engine 424 or the application information indexer 412. For example, the search engine 424, in response to a question or query for information concerning a particular application, may search for such information in one or more of the information sources 360 via the application information interface 410. In one implementation, the application information interface 410 may communicate with each of the information sources 360 by way of its specific communication protocol to search for and retrieve information regarding one or more applications.

In other examples, the application information interface 410 may retrieve information concerning one or more applications from the information sources 360 under the guidance of the application information indexer 412, as noted above. In one implementation, the application information indexer 412 may initiate retrieval of information for one or more specific applications in a proactive manner, thus not necessarily awaiting a specific request from a user device for such information.

For each portion of information regarding an application that is retrieved via the application information interface 410, the application information indexer 412 may create indexing information 444 to associate that information with one or more specific applications, along with context information that may more specifically identify the environment or other contextual aspects under which the application may be executed. In some examples, the application information indexer 412 may initiate retrieval or access, by way of the application information interface 410, of at least some of the application information 442 upon which the indexing operations are performed. The application information indexer 412 may then store the retrieved application information 442 with its associated indexing information 444 (including context information). Thereafter, when the search engine 424 searches for particular application information 442 in response to receiving a question or query and accompanying context information, the search engine 424 may employ the indexing information 444 to select the associated application information 442 and return the selected information 442 via the web application 422 and web server 420 to the user system requesting the information.

In addition to the application information 442 and the indexing information 444, the data storage 440 may also include user interaction information 446 associated with at least some of the application information 442. The user interaction information 446 for a particular portion or item of the application information 442 (e.g., a particular answer or reply) may include, but is not limited to, a number of endorsements of the item by users, a number of negative reactions to the item by users, a number of times users ignored the item when presented to the users, and so forth. In some embodiments, the user interaction information 446 associated with a particular portion of application information 442 may indicate how useful a particular user believed the associated application information 442 to be. The user interaction information 442 may also be associated with the particular interacting user so that other application information 442 of possible interest to that user may be routed to that user. In one example, a user, in response to receiving requested application information 442 from the application information access system 400, may indicate the relative usefulness of the information via a graphical user interface provided by the web application 422. The web application 422 may then store the user interaction information 446 in conjunction with the retrieved application information 442 in the data storage 440. Thereafter, the search engine 424 may then use the user interaction information 446 and the indexing information 444 (including context information) to determine whether to select (and possibly rank among other informational items) the associated application information 442 as a response to a subsequent question or query received from another user system.

Thus, by employing the application information access system 400 of FIG. 4, a user that is currently employing an application, either locally or via a server system, may initiate a query, question, or other type of request for information regarding that application while continuing to interact with the application. Further, the request may include context information associated with the execution of the application, which the application information access system 400 may utilize either to determine which preexisting application information 442 is most relevant for this particular request, or to provide another user of the application information 442 with the context information to allow the other user to provide a more specific and useful answer. Other possible aspects of the application information access system 400, as well as other systems and methods disclosed herein, are explained in the following description.

Figure 5:
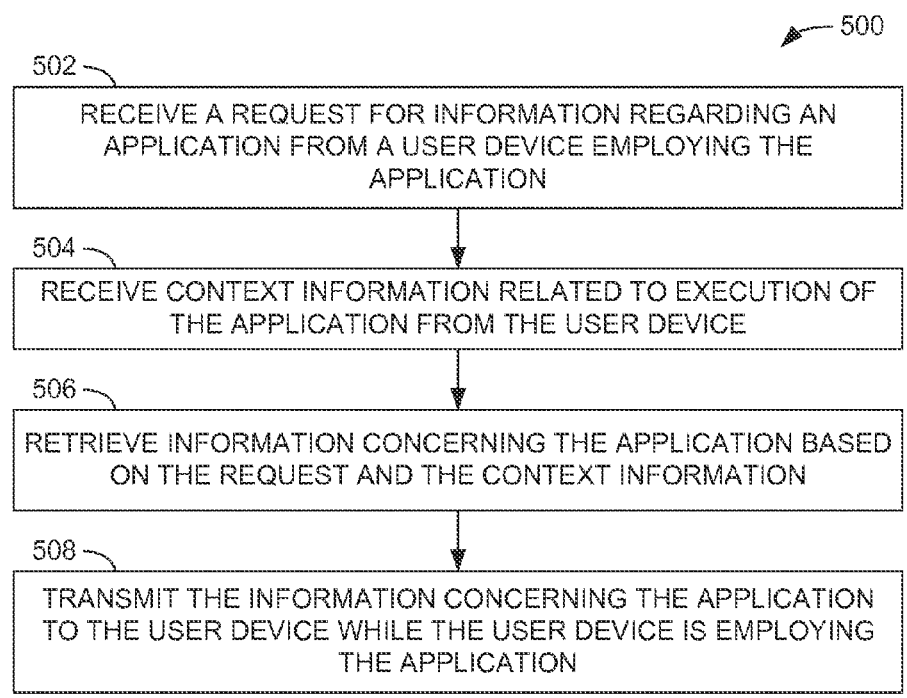
FIG. 5 is a flow diagram illustrating an example method of providing access to context-driven application information.

FIG. 5 is a flow diagram illustrating an example method 500 of providing access to context-driven application information, such as via the application information access system 400 of FIG. 4. While the various operations of the method 500 are described in reference to the application information access system 400, other devices or systems may be employed to perform the method 500 in other embodiments.

In the method 500, the application information access system 400 may receive a request for information regarding an application from a user device (e.g., the client system 320 or the user system 340) (operation 502). The application information access system 400 may also receive context information related to execution of the application from the user device (operation 504). Various examples of the context information are discussed below in connection with FIG. 6. The application information access system 400 may then retrieve information concerning the application (e.g., application information 442) based on the request and the context information (operation 506). The application information access system 400 may then transmit the retrieved application information 440 to the user device while the user device employs the application (operation 508). As a result, a user of the user device may receive a useful response to the query while continuing to use the application.

While the operations 502 through 508 of the method 500 of FIG. 5 are shown in a specific order, other orders of operation, including possibly concurrent or continual execution of at least portions of one or more operations, may be possible in some implementations of method 500, as well as other methods discussed herein. In fact, each of the operations 502 through 508 may be performed in a continual, repetitive, or ongoing manner asynchronously to process multiple requests concurrently in some embodiments.

Figure 6:
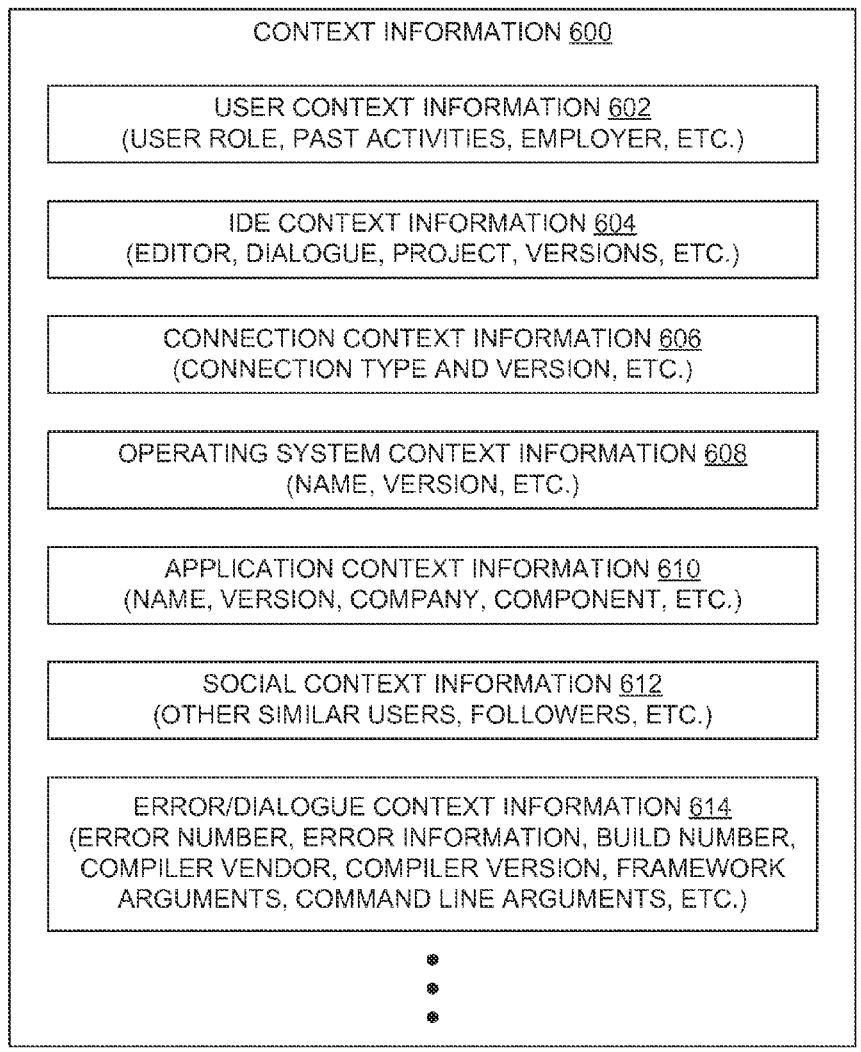
FIG. 6 is a block diagram illustrating example context information.

FIG. 6 is a block diagram illustrating example context information 600 that may serve as the context information discussed above for a particular set of application information 442. As indicated earlier, the context information 600 may be stored as part of, or associated with, the indexing information 444 associated with a particular set of application information 442. In FIG. 6, one possible type of context information is user context information 602, which may include, for example, the role of the user with respect to the application (e.g., programmer, end user, system administrator, data center operator, system modeler, and so on), past activities and/or behaviors of the user regarding the application (e.g., previous context information associated with the user; previous requests submitted by the user; previous answers and/or replies supplied by the user; number of endorsements supplied by the user; number of other users, information requests, and/or topics followed by the user; number of times the user has bookmarked, flagged, and/or ignored a particular question, answer, or topic, number of times the user has searched for a particular informational item or topic: etc.), the employer of the user, the current geographic location of the user, the language of choice of the user, and the like.

If the application is being employed within an IDE, IDE context information 604 may be stored. The IDE context information 604 may include, for example, identification of a current editor, a current dialogue, a current project, and a current perspective of the IDE environment. The IDE context information 604 may, in some examples, further include version numbers for the IDE and any applications or environments employed therein, such as the editor, database server, JVM (Java Virtual Machine), JRE (Java Runtime Environment), and the like.

In some implementations, the context information 600 may also include connection context information 606 relating to a connection (e.g., a database connection) between, for example, the client system 320 and the server system 330 of FIG. 3. In an example, the connection context information 606 may include the current connection type and version (e.g., JDBC (Java Database Connectivity), ODBC (Open Database Connectivity), Python ODBC, etc.), the database client version, the version of a browser, and the like.

The context information 600, in some examples, may include operating system context information 608, such as the name and version number of the operating system used in the client system 320 or user system 340, 350, the name and version of the operating system of the server system 330 or cloud system being employed by the client system 320, and so on.

In at least some implementations, the application context information 600 may include application context information 610 for the application being employed by the user (e.g., one of the applications 322, 332, 342 of FIG. 3). The application context information 610 may include, for example, but is not limited to, the name and version of the application, the company that provided or created the application, the particular application screen or component being employed, and so forth.

The context information 600 may also include social context information 612, such as, for example, other users similar to those of the current user, endorsements of application information 442 provided by those similar users, followers of the current user, and so on.

In some embodiments, the context information 600 may include error/dialogue context information 614 resulting from an error occurring during use of the application. Examples of this form of information may include the name of the error, the type of the error (e.g., runtime error, syntax error, security error, activation error, and so on); information from a log file, execution trace, or stack trace: build number; compiler vendor and version; bootloader environment; framework arguments; command line arguments; and the like.

In other embodiments, each type of context information 600 may include additional or different data from that described above, and more or fewer types of context information 600 may be provided as well. Much of the context information 600 may be provided in conjunction with an information request with little-to-no effort on the part of the user, thus possibly enhancing the quality of the requested information in an efficient manner.

Figure 7:
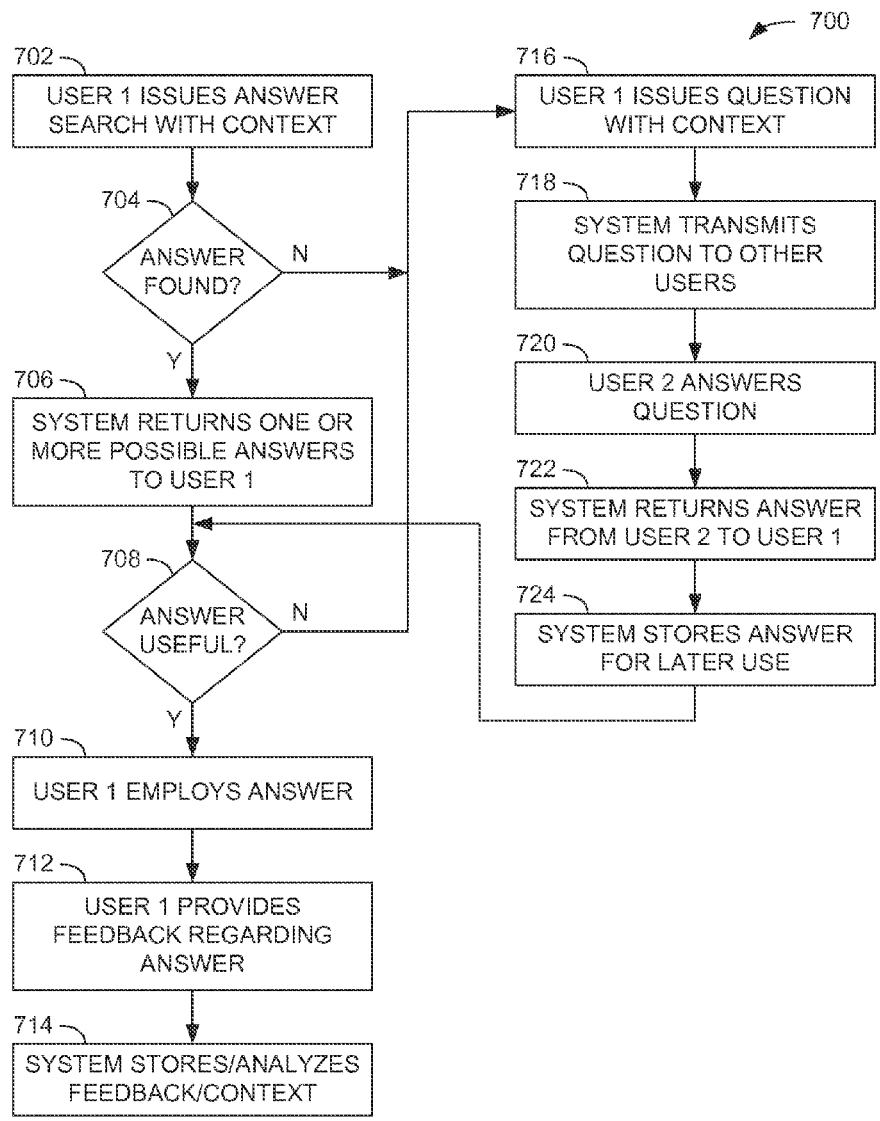
FIG. 7 is a flow diagram of another example method of providing access to context-driven application information.

FIG. 7 is a flow diagram of another example method 700 of providing access to context-driven application information. In the method 700, a user ("User 1") issues or initiates a search for information (herein, an "answer" to the search) related to a particular application, accompanied by context information (operation 702), as described above. In at least one example, the user issues the search from the client system 320 while employing the application 322, 332, or from the user system 340 while using the application 342 located therein.

In response to the search or request, the application information access system 310, 400 determines whether a corresponding answer is available (operation 704). The application information access system 310, 400 may search the data storage 440, the information sources 360, or some combination thereof, for the answer. If a possible answer is not found, User 1 may proceed with issuing a question with context information to one or more other users (operation 716). This possibility is discussed more fully below.

If, instead, one or more possible answers are discovered, the application information access system 310, 400 may return at least some of those possible answers to User 1 (operation 706). At that point, User 1 may determine whether any of the returned answers are useful or usable (operation 708). If not, User 1 may issue a question with context information to at least one other user (operation 716), as mentioned above.

Alternatively, if User 1 finds at least one of the returned possible answers to be useful, User 1 may employ at least one of the answers in some way (operation 710), such as by altering some programming code, updating a version of the application, or some other action. User 1 may then provide feedback (e.g., an endorsement, a rejection, and/or an ignoring of the answer) to the application information access system 310, 400 regarding the employed answer (operation 712), as well as one or more of the returned, but unimplemented, answers. In response, the application information access system 310, 400 may store, and possibly analyze, the feedback, as well as the context, of the employed answer, perhaps along with that of the other returned answers.

If User 1 has proceeded to issuing a question, including at least some context information, to one or more other users (operation 716), the application information access system 310, 400 may transmit or route that question to the other users (operation 718). In one example, the application information access system 310, 400 transmits the question to those users that are currently employing the same application, or a related application, as the application for which an answer is desired. In some implementations, the application information access system 310, 400 may transmit the question to users that are recognized to have at least significant knowledge of the application in question.

In response to receiving the question, one of the other users ("User 2") may provide an answer for the question to the application information access system 310, 400 (operation 720), which may then return the provided answer to User 1 (operation 722). The application information access system 310, 400 may also store the provided answer for subsequent use as an answer to a similar or related question (operation 724). User 1 may then process the answer in much the same way as a retrieved answer by determining if the answer is useful (operation 708), employing the answer if so (operation 710), and possibly providing feedback regarding the answer (operation 712). Also, the application information access system 310, 400 may store, and possibly analyze, the feedback and associated context in conjunction with the employed answer (operation 714). In some examples, the application information access system 310, 400 may also return or push any or all of the answers, associated feedback information, ranking information, and the like to one or more of the original information sources 360 (e.g., user community, customer support site, or the like) so that users of the information source 360 may benefit from the additional information.

The method 700 provides just one particular scenario under which answers or information regarding a specific application or environment may be solicited, received, and distributed. Other possibilities also exist. For example, the user may proceed directly with asking a question of other users if a sufficient preexisting answer is already known to be unavailable.

FIGS. 8-17 depict example screenshots of graphical user interfaces for providing context-driven application information access, generally according to the method 700 of FIG. 7. While the following example screenshots reflect a scenario in which a technical user, such as a programmer or tester, is employing an IDE, many other examples of providing context-driven application information are also contemplated, such as accessing the information from within an application outside an IDE, accessing the information via a website from within or outside an IDE, and so on.

Figure 8:
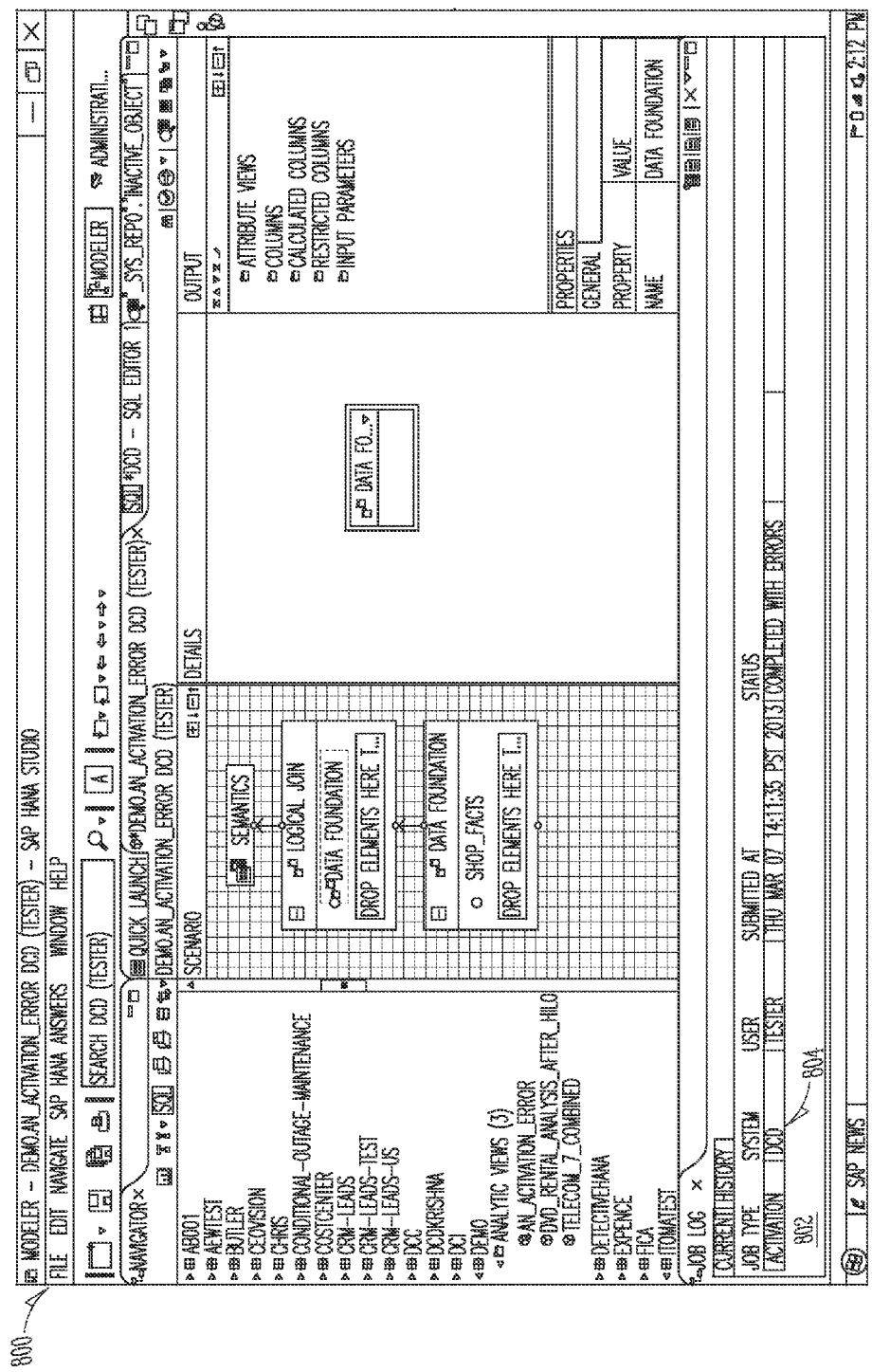

FIG. 8 depicts a graphical user interface 800 for an IDE (e.g., SAP® HANA® Studio by SAP® AG of Walldorf, Germany, for the SAP HANA in-memory database system). In one example, the IDE provides an interface by which a programmer, tester, operations manager, or other technical personnel may execute, test, debug, or analyze programming code of an application. More specifically regarding FIG. 8, a modeling application of the IDE is being employed to generate statistics or other information to project performance of a particular program. In this example, the IDE denotes, in a job log window 802 of the IDE, a job entry 804 for an activation job initiated by user "TESTER" as part of a new coding project. Further, the job entry 804 indicates that the activation job completed, but encountered at least one error.

Figure 9:
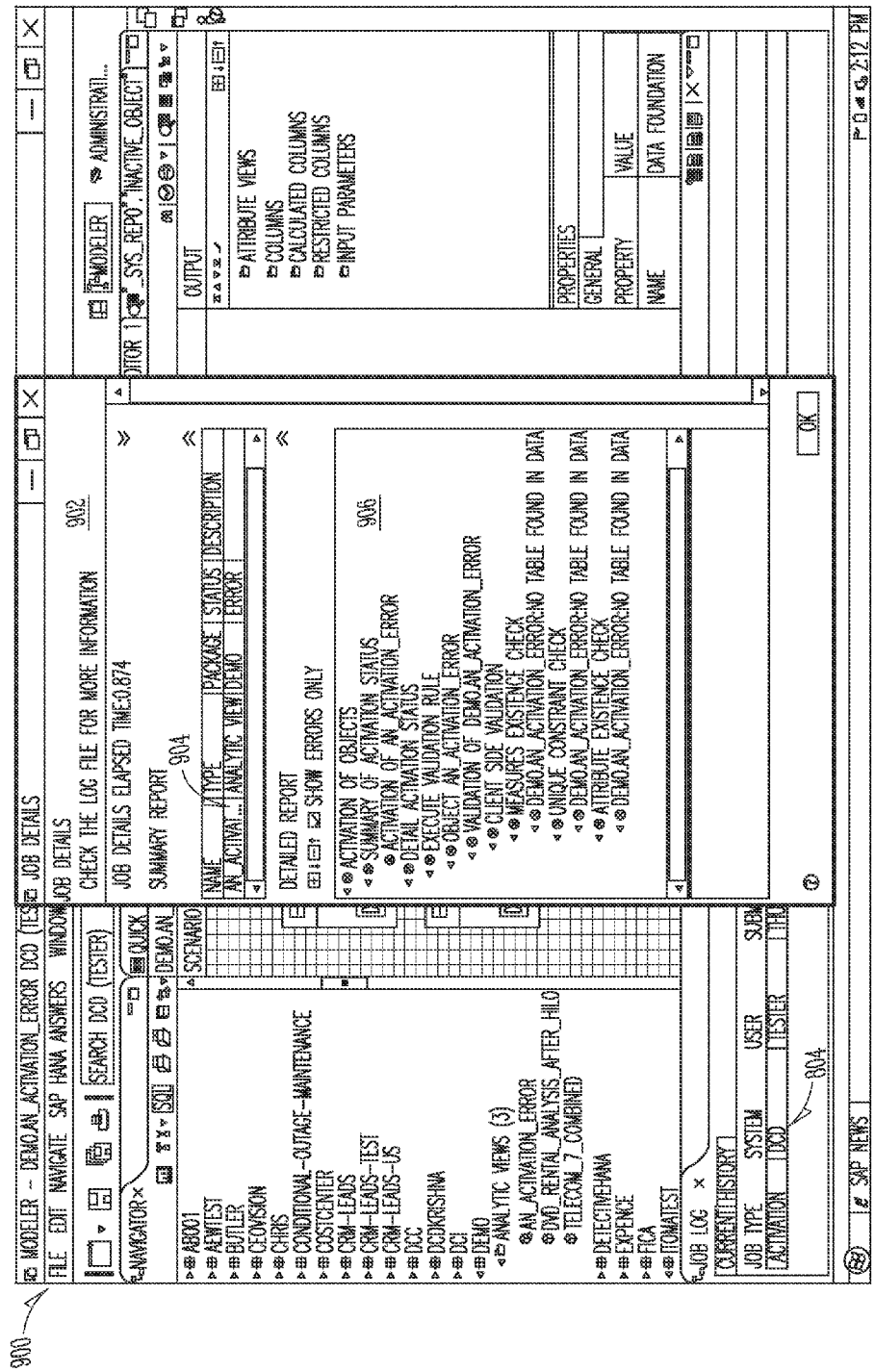
Figure 10:
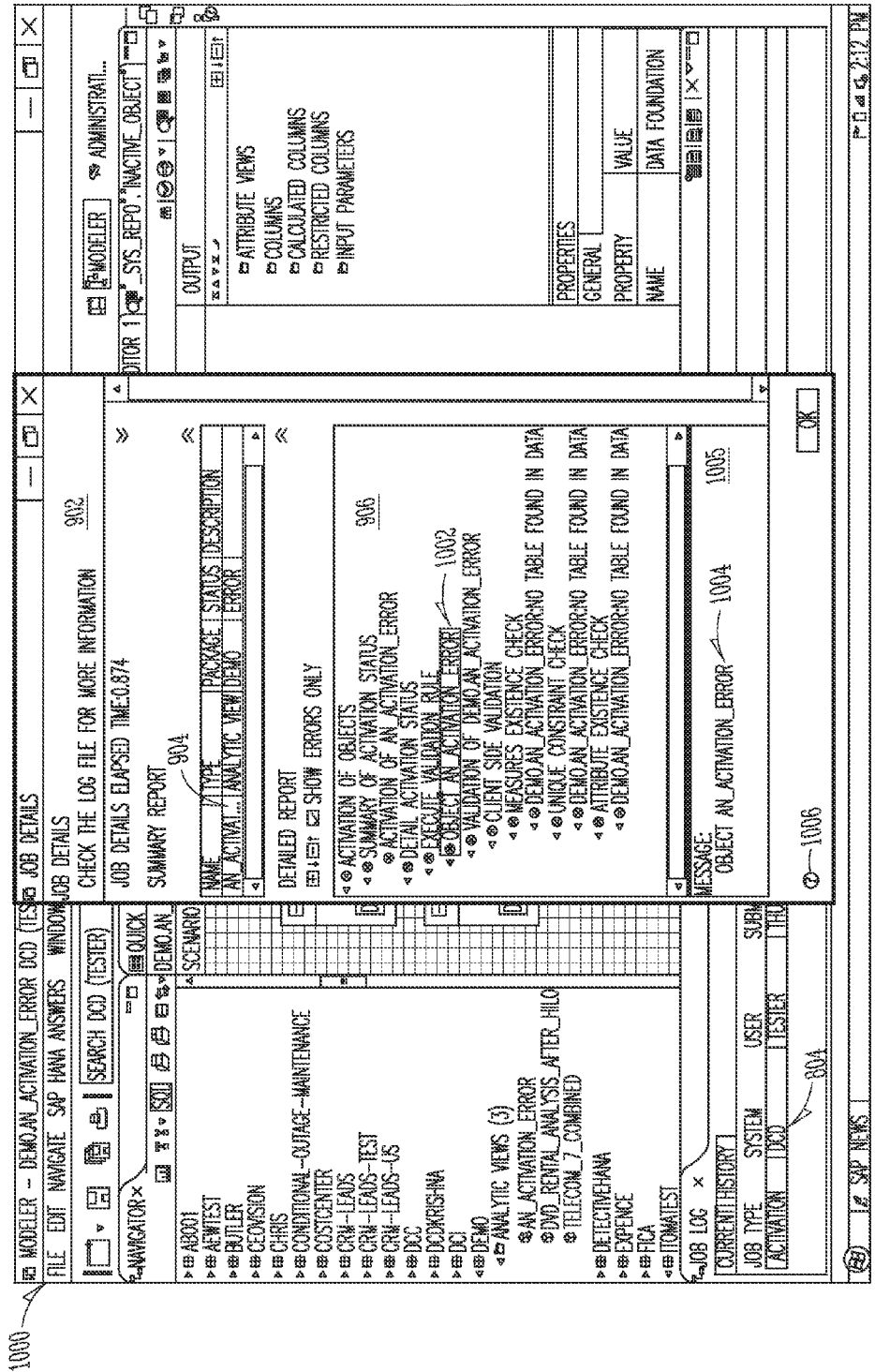

FIG. 9 depicts a graphical user interface 900 that is presented in response to the user activating (e.g., double-clicking) the job entry 804. Accordingly, a job details window 902 is presented in which an activation error indication 904 is denoted, along with a detailed report window 906. FIG. 10 depicts a subsequent graphical user interface 1000 that displays an indication of a particular object 1004 (Object AN_ACTIVATION_ERROR) in a message window 1005 in response to the user selecting the object 1002 in the detailed report window 906. Thereafter, the user may activate (e.g., click) a question button 1006 in the job details window 902, resulting in the graphical user interface 1100 of FIG. 11, in which an answers side panel 1102 is added to the job details window 902. In some examples, the user may also be able to enter explicit search terms in addition to the context information provided, such as in the message window 1005 or another text entry area not explicitly shown in FIG. 10. In an implementation, the application information access system 310, 400 presents the answers side panel 1102 via a plug-in for the IDE (e.g., the plug-in 324 of FIG. 3). In examples not involving an IDE, an application in which the user is working may employ an extension or similar add-on for the application to facilitate access to the answers side panel 1102 or similar user interface region. In one example, the activation of the question button 1006 initiates a search for information or answers directed toward addressing the encountered activation error.

Figure 11:
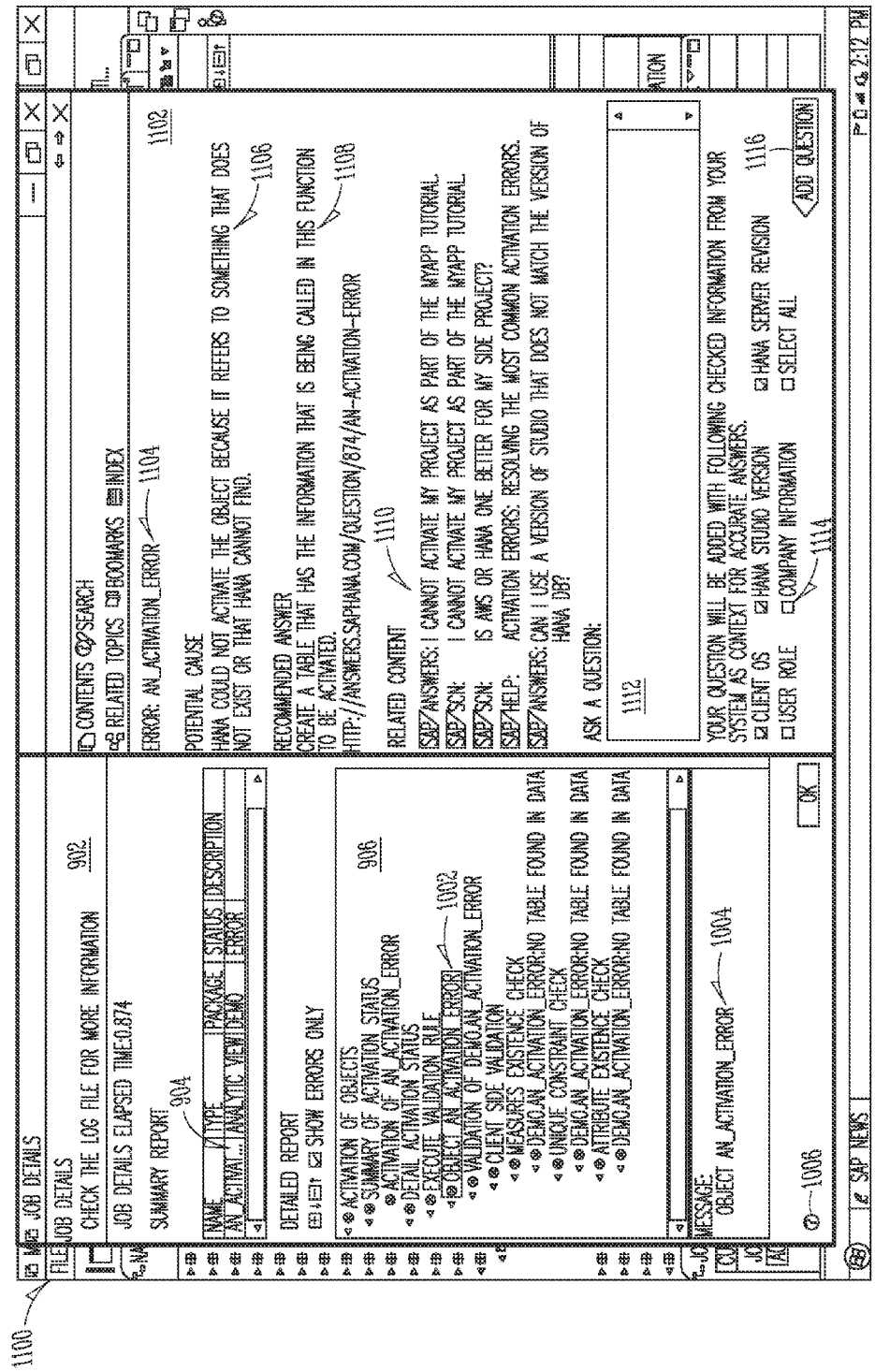

More specifically in FIG. 11, the answers side panel 1102 provides an error title 1104 ("AN_ACTIVATION_ERROR") and application information (e.g., application information 442 of FIG. 4) intended to address that error. The answers side panel 1102 thus provides application information in response to the request of the user while the user continues to work within the IDE. In one example, the presented information may also depend on one or more items of content information, such as identification of the IDE, the identity of the particular user, the role of the user, and other information. As shown in FIG. 11, the presented information may include a potential cause 1106 for the error; a recommended answer 1108 that, if implemented by the user, may eliminate the error; and related content 1110 that may represent other possible answers to the request of the user. For the recommended answer 1108 and the related content 1110, the answers side panel 1102 may provide links to the original information source (e.g., information source 360 of FIG. 3) of the provided answers, as well as the identities of the information sources 360 (e.g., the SAP HANA Answers site, the SAP Community Network (SCN) site, the SAP Help site, the SAP Notes site, the SAP HANA Academy educational site, etc.).

In an example, the user that is requesting information does not find useful information or answers in the answers side panel 1102. Accordingly, the user may then pose a question to other users via a question text entry box 1112. Also, in addition to the question, the user may select which, if any, types of context information are to be supplied with the question to the other users. In the specific example of FIG. 11, the user posing the question may select none, any, or all of the context information types regarding the client operating system, the HANA Studio (IDE) version, the HANA server revision, the role of the user, and the company of the user via a set of context check boxes 1114. As a result, the user can control which types of context information are to be provided and shared along with the question to other users without having to provide that information manually. In other examples, the context information may be more or less user-configurable than that shown in FIG. 11. In some implementations, any or all of the context information may be hidden entirely from any or all users. In at least some embodiments, the context information is retrieved and stored in the system irrespective of any selections by the user regarding which portions of the context information are to be shared with other users. Once the user has entered the question in the question text entry box 1112 and selected the desired context check boxes 1114, the user may activate (e.g. click) an add question button 1116 to transmit the question to other users. In an example, the user may highlight text, such as program code, errors messages, or any other text provided on the screen, and then click the add question button 1116 (or another button not shown in FIG. 11) to reduce the amount of typing by the user before posing the question. Similarly selected text can also be employed as one or more search terms when a user activates a button or other interface feature to retrieve an answer. In some examples, the user may also enter additional search terms, words, or phrases in the text entry box 1112 or another input entry area not specifically depicted in FIG. 11 before posing the question.

In an implementation, the answers side panel 1102 may provide an icon or other user-selectable element that allows the user to pose the question anonymously. Such a function may be provided to facilitate the posing of questions without fear of any potential embarrassment on the part of the user.

In one example, the other users to which the question is posed may be limited to those users that work for the same company or entity as the user posing the question. More generally, access to information in the form of questions, answers, and the like may be restricted to only those users that belong to the same entity or organization. As a result, the application information access system 310, 400 may organize the users into separate user communities based on their entity or organization affiliation.

Figure 12:
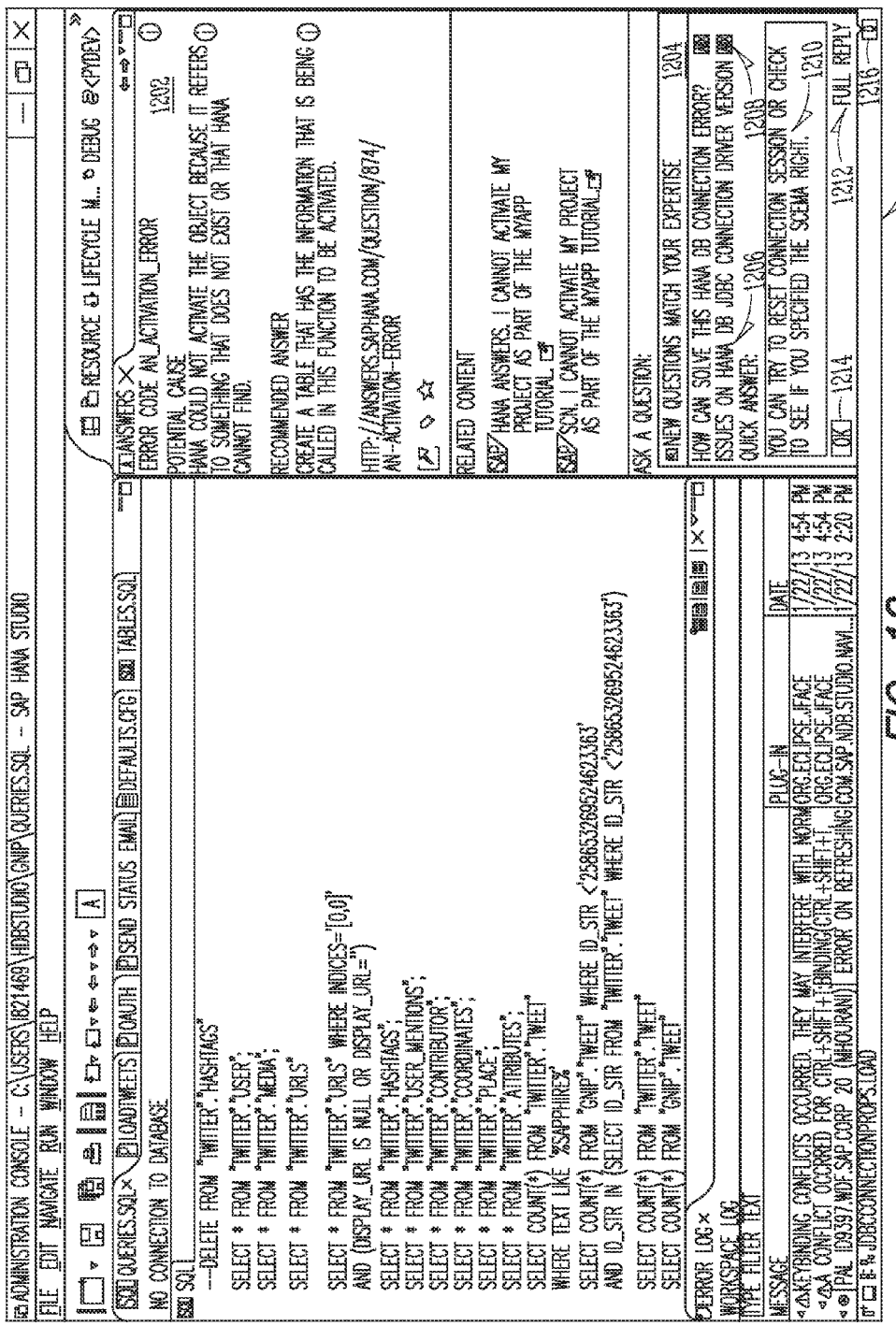

FIG. 12 presents a graphical user interface 1200 of a second user operating within an administration console of the SAP HANA Studio. Displayed in the graphical user interface 1200 is an answers side panel 1202 similar to that of the answer side panel 1102 of FIG. 11 that is seen by the first user. In response to the question being submitted by the user, the IDE environment of the second user may present a new questions window 1204 to the second user to notify the second user of questions that the second user may answer. In one example, the application information access system 310, 400 may route specific questions to particular users based on how well the question and the accompanying context information match the expertise of, or other background information associated with, the potential answerers, possibly including past and/or current context information associated with the potential answerers. The new questions window 1204 may be presented in response to the second user activating a questions indicator 1216, or the new questions window 1204 may be presented or pushed to the second user in response to a new question being directed by the application information access system 310, 400 to the second user. Further, the second user may, in some implementations, may be able to configure whether the new questions window 1204 is automatically pushed to the screen or displayed only in response to activation of the questions indicator 1216.

As shown in FIG. 12, the new questions window 1204 may include one or more questions 1206 directed to the second user, along with associated action buttons 1208 that allow a user to proceed to an answers website (e.g., via an "A" button) to review the question, or to dismiss a question (e.g., via an "X" button). (An example of an answers website hosted by the application information access system 310, 400 is provided below in FIG. 13.) In an example, the question 1206 may be activated to yield additional information (not shown in FIG. 12) within the IDE, such as the full text of the question, context information related to the question, and so on. If the second user decides to answer a question, the second user may type the answer in a quick answer text box 1210. In some examples, the second user may activate a "full reply" link 1212 to provide a more fully-featured interface (not shown in FIG. 12) to allow the second user to input additional information, such as code segments, still images, video segments, and so on, to the answer. Once the answer is complete, the second user may activate a transmission button 1214 ("OK") to send the answer to the first user. As with the input provided by the first user, the second user may cut and paste, or highlight, program code and other information from the interface into the quick answer text box 1210 or the full reply area mentioned above. Also, the second user may be allowed to respond anonymously in a fashion similar to that noted above regarding the posing of a question by the first user.

FIG. 13 provides a graphical user interface 1300 of an alternative example of responding to the question posed by the first user. In this example, a third user by way of a user device (e.g., the user system 350 with browser 352) may be browsing an answers web site provided by the application information access system 310, 400 and access a web page displaying the question, as indicated by a question title 1302 ("HANA Object Activation Error") and a question description 1304. The question may also be supplemented with context information 1306. To respond, the third user may type an answer into a reply text box 1308. In addition, a follow button 1312 may be provided that, when activated by the third user, will allow the third user to be advised of other answers and discussion involving this particular question.

Figure 14:
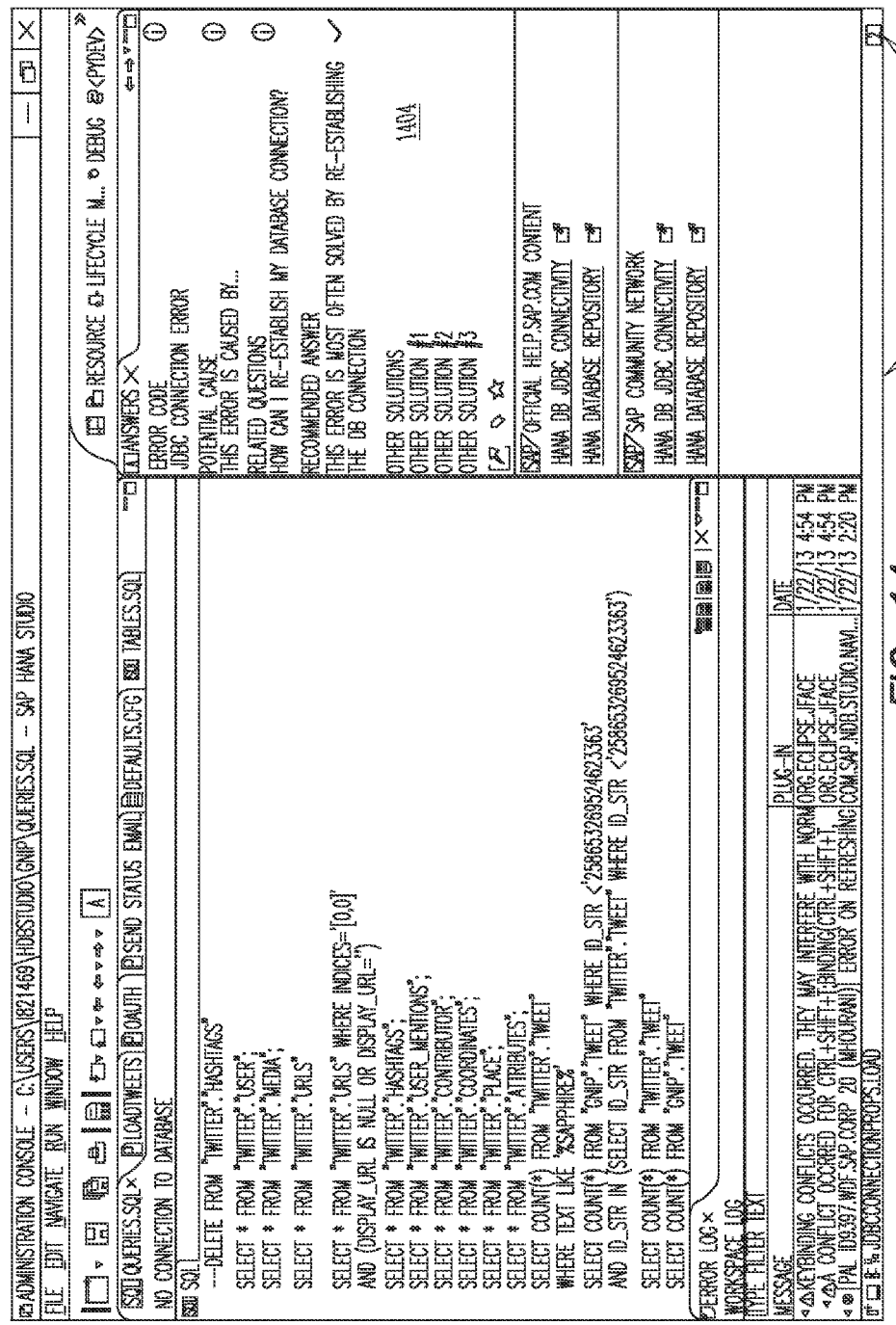
Figure 15:
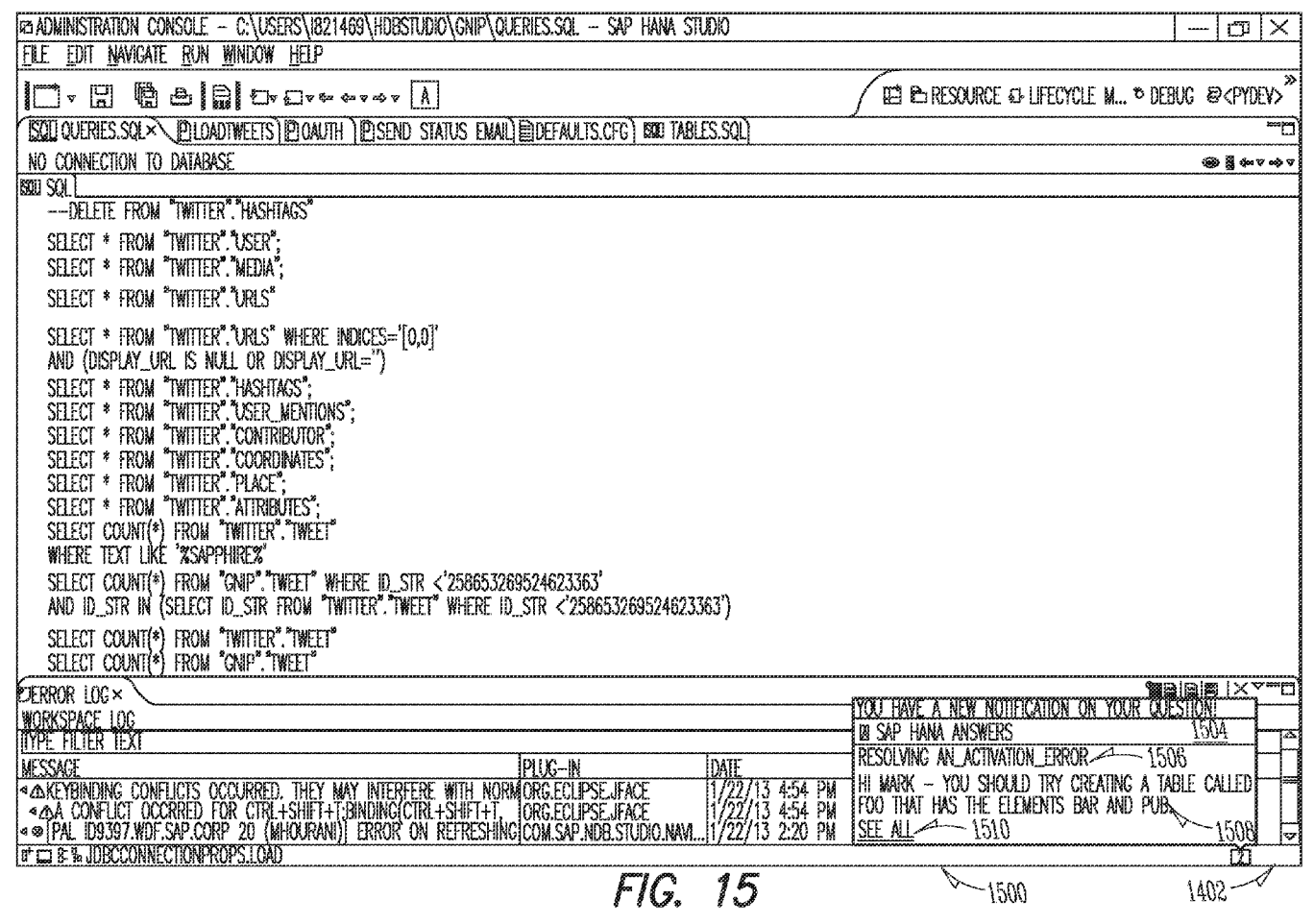
Figure 16:
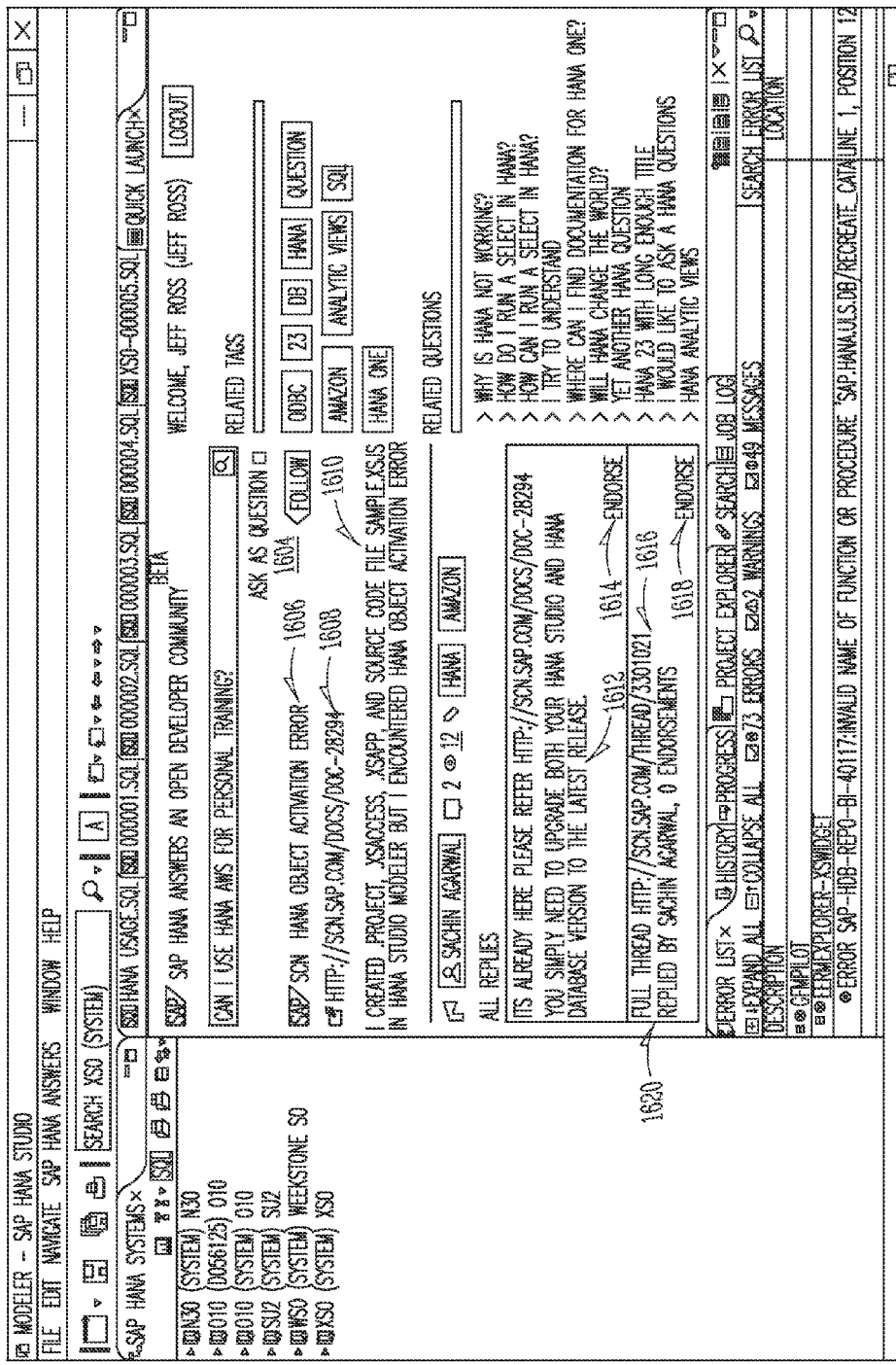

FIG. 14 presents a graphical user interface 1400 of the IDE environment of the first user, in which an answer indicator 1402 displayed therein indicates that two answers to the previous question have been returned. As multiple users may answer a question, information regarding an issue with an application may be generated via crowd-sourcing. In addition to the answer indicator 1402, an answers side panel 1404 may be displayed, in which the first user has attempted to retrieve information regarding a second error that has been encountered (e.g., a JDBC connection error). In response to the first user activating the answer indicator 1402, a graphical user interface 1500, as illustrated in FIG. 15, may display an answers window 1504, which presents at least one answer 1508 in conjunction with a question label 1506, thus identifying the specific question to which the answer responds. In one example, the first user may activate the question label 1506 to see the full answer in a separate window (not shown in FIG. 15). Also, the answers window 1504 may provide a "see all" link 1510 to allow the first user to view all answers that have been returned. In another example, in a manner similar to that discussed above in conjunction with FIG. 12, the first user may be notified of the answer information by way of the answers window 1504 being presented or pushed to the screen with or without explicit input or activation from the first user. FIG. 16 depicts a graphical user interface 1600 of the answers website, as viewed by the first user, from within a window 1604 of the IDE. This site may provide a question label 1606 (possibly including an information source 360 from where the answer was retrieved), a link 1608 to the information source 360 that provides more detailed information (e.g., a document providing a solution to the error), the original question 1610, and a short reply included in the answer from the second user 1612. The first user may also endorse the answer by activating a first endorsement link 1614. In the specific example of FIG. 16, the answers website may also provide a link 1620 to the original discussion thread in the information source 360 that provides information pertaining to the answer, an identification 1616 of the second user who provided the answer, and a second endorsement link 1618 that allows the first user to endorse the second user as a reliable source of information.

In addition to receiving responses to the questions of the first user, the first user may also follow other users, questions of other users, more general topics of interest, and other categories of information so that such information may be delivered to the first user in the manner described above. For example, the first user may specify various search terms or tags for the particular information that is of interest to the first user. In addition, the application information access system 310, 400 may identify topics that are currently of particular interest and provide tags or identify key phrases for those topics, which the user may then select to follow.

Figure 17:
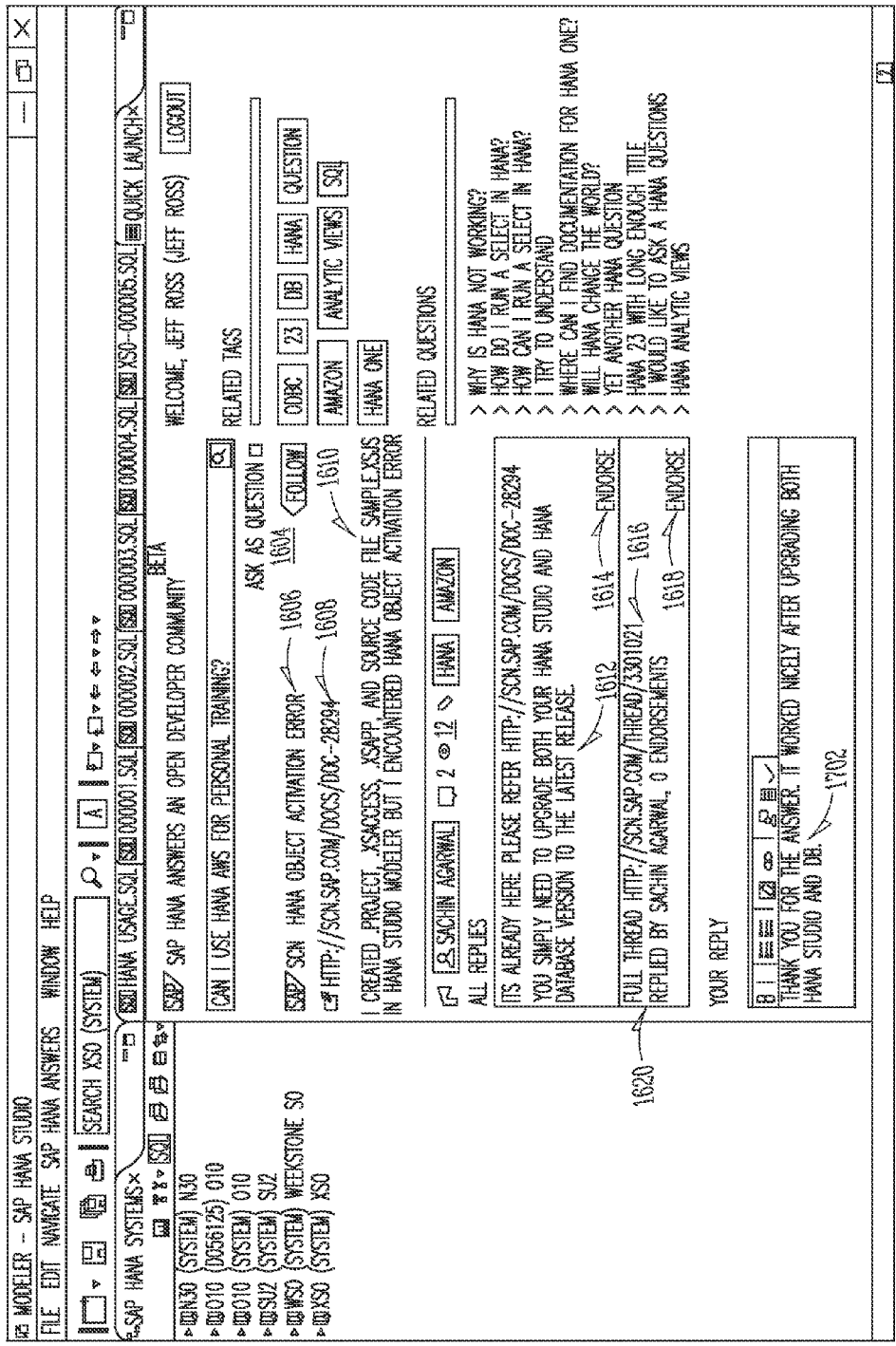

FIG. 17 presents a graphical user interface 1700 similar to that of FIG. 16, in which the user, in addition to endorsing the answer via the first endorsement link 1614 or the answerer via the second endorsement link 1618, may reply to the answerer via a reply text box 1702. In one example, the application information access system 310, 400 may use the endorsements and replies to rate answers to particular questions so that, in response to a subsequent question addressing a similar error or problem, the application information access system 310, 400 may rank the various answers when presenting them to the next questioner.

Given the application information 442 (e.g., answer information), indexing information 444 (e.g., context information), and user interaction information 446, the application information access system 310, 400 may be able to analyze that data to determine various characteristics regarding the application and the application information access system 310, 400. For example, the application information access system 310, 400 may determine which portions of the application cause the most errors, problems, or confusion, as well as the effectiveness and timeliness of the application information access system 310, 400 to address the errors. The application information access system 310, 400 may also track such information over multiple revisions of an application to determine error trends. Other types of analysis using the information in the data storage 440 of the application information access system 310, 400 may be employed in other embodiments.

As a result of at least some of the embodiments described above, users may both pose questions and provide answers to issues relating to a particular application while still working with that application, or within an IDE associated with that application. Further, information may be aggregated from multiple information sources for access by users within the application environment. Moreover, the use of context information regarding execution of the application may enhance the accuracy and usefulness of the information provided, as described above. The requesting users may provide the context information, or portions thereof, quickly, such as by way of an icon or button selection, to facilitate a more accurate response or diagnosis to a problem or issue by one or more other users. Additionally, the desired information may be provided by recognized experts, or by other users of the user community, thus providing a type of crowd-sourcing of useful information in a social network environment associated with the particular application. The usefulness of the information may be further augmented by feedback provided by the requesting users to further direct worthwhile information to other users. As a result, the embodiments described above may provide problem-solving and general instructional information to a user. Further, developers and others associated with the particular application may use the application information being captured, along with the associated context information and user interaction information, to evaluate the effectiveness, stability, and other aspects of both the application and any technical documentation or other information associated therewith.

While the examples provided above describe the access of information within an IDE or programming environment, other environments that employ any type of application may benefit from application of the principles described herein. For example, if a user of a smart phone encounters a problem with a particular application executing on the phone, the user may search for information or generate a question while continuing to interact with the application, and thereafter receive worthwhile information to address that problem while continuing to use the application. Many other types of user devices and applications may also benefit from the embodiments described above.

Figure 18:
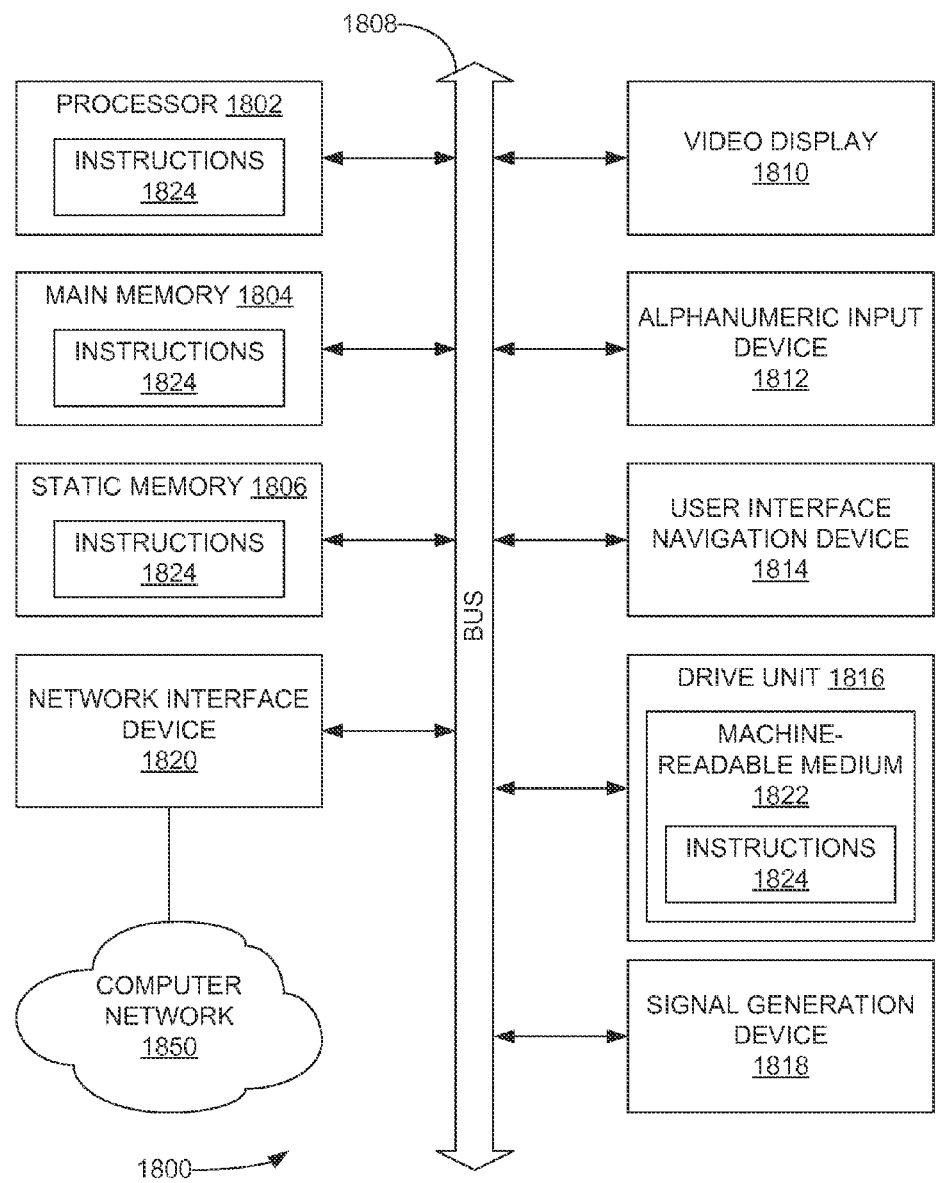
FIG. 18 is a block diagram of a machine in the example form of a processing system within which may be executed a set of instructions for causing the machine to perform any one or more of the methodologies discussed herein.

FIG. 18 depicts a block diagram of a machine in the example form of a processing system 1800 within which may be executed a set of instructions 1824 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1800 includes a processor 1802 (e.g., a central processing unit (CPU), a graphics processing unit (GPU), or both), a main memory 1804 (e.g., random access memory), and static memory 1806 (e.g., static random-access memory), which communicate with each other via bus 1808. The processing system 1800 may further include video display unit 1810 (e.g., a plasma display, a liquid crystal display (LCD), or a cathode ray tube (CRT)). The processing system 1800 also includes an alphanumeric input device 1812 (e.g., a keyboard), a user interface (UI) navigation device 1814 (e.g., a mouse), a disk drive unit 1816, a signal generation device 1818 (e.g., a speaker), and a network interface device 1820.

The disk drive unit 1816 (a type of non-volatile memory storage) includes a machine-readable medium 1822 on which is stored one or more sets of data structures and instructions 1824 (e.g., software) embodying or utilized by any one or more of the methodologies or functions described herein. The data structures and instructions 1824 may also reside, completely or at least partially, within the main memory 1804, the static memory 1806, and/or within the processor 1802 during execution thereof by processing system 1800, with the main memory 1804, the static memory 1806, and the processor 1802 also constituting machine-readable, tangible media.

The data structures and instructions 1824 may further be transmitted or received over a computer network 1850 via network interface device 1820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1800) or one or more hardware modules of a computer system (e.g., a processor 1802 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1802 that is configured using software, the general-purpose processor 1802 may be configured as respective different hardware modules at different times. Software may accordingly configure a processor 1802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1802 that are temporarily configured (e.g., by software) or permanently configured to perform the relevant operations. Whether temporarily or permanently configured, such processors 1802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1802 or processor-implemented modules. The performance of certain of the operations may be distributed among the one or more processors 1802, not only residing within a single machine but deployed across a number of machines. In some example embodiments, the processors 1802 may be located in a single location (e.g., within a home environment, within an office environment, or as a server farm), while in other embodiments, the processors 1802 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of context-driven information access, the method comprising:
   receiving, from a user device employing an application, a first request for information concerning the application;
   receiving, from the user device, context information related to execution of the application, the context information comprising information describing an execution environment at the user device during execution of the application;
   retrieving, based on the request and the context information, information concerning the application;
   transmitting, to the user device, the information concerning the application while the user device is employing the application; and
   receiving, from the user device in response to the transmitting of the information to the user device, a second request for information concerning the application for presentation to at least one other user, the second request for information including at least a portion of the context information selected by a user of the user device.

2. The method of claim 1, wherein the context information is received with the first request.

3. The method of claim 1, wherein the first request includes at least one search term.

4. The method of claim 1, wherein the context information comprises information describing a communication connection between the user device and a server executing the application.

5. The method of claim 1, wherein the context information comprises information describing an execution environment of the application.

6. The method of claim 1, wherein the context information comprises information describing an error encountered during execution of the application.

7. The method of claim 1, wherein the context information comprises displayed information selected by a user from a display of the user device.

8. The method of claim 1, wherein the context information comprises information describing a user of the user device using the application.

9. The method of claim 1, wherein the application comprises an application executed from within an integrated development environment.

10. The method of claim 1, wherein the retrieving of the information concerning the application comprises:
searching, using the first request and the context information, a database of reply information returned in response to at least one previously submitted request for information concerning the application; and
selecting the information concerning the application from the database of reply information based on the searching of the database of information.

11. The method of claim 10, wherein the retrieving of the information concerning the application further comprises:
accessing, from the database of reply information, at least one indication of a user interaction with the information concerning the application from a second user device;
wherein the selecting of the information concerning the application is also based on the at least one indication of the user interaction with the information concerning the application.

12. The method of claim 10, further comprising:
receiving, from the user device in response to the transmitting of the information to the user device, a user interaction with the information concerning the application while the user device is employing the application; and
storing an indication of the user interaction in the database of reply information, the indication to be used in searching the database of reply information in response to the subsequent request from the third user device.

13. The method of claim 1, wherein the retrieving of the information concerning the application comprises:
selecting, based on at least a portion of the context information, a second user of a second user device employing the application to receive the second request and the context information;
routing the second request and the context information to the second user of the second user device employing the application; and
receiving, responsive to the routing of the second request and the context information, the information concerning the application from the second user via the second user device.

14. The method of claim 13, further comprising:
storing the information concerning the application in a database of reply information, the reply information being available as information concerning the application in response to a subsequent request from a third user device.

15. A non-transitory computer-readable storage medium comprising instructions that, when executed by at least one processor of a machine, cause the machine to perform operations comprising:
receiving, from a user device employing an application from within an integrated development environment, a request for information concerning the application;
receiving, from the user device, context information related to execution of the application from within the integrated development environment, the context information including at least a portion selected by a user of the user device; routing the request and the context information to a second user of a second user device employing the application;
retrieving, based on the request and the context information, first information concerning the application;
receiving, responsive to the routing of the request and the context information, second information concerning the application from the second user via the second user device; and
transmitting, to the user device, the first information concerning the application and the second information concerning the application while the user device is employing the application from within the integrated development environment.

16. The non-transitory computer-readable storage medium of claim 15, wherein the application comprises one of a database system and an application accessing the database system.

17. The non-transitory computer-readable storage medium of claim 15, wherein the first request is received from the user device via a plug-in module executing on the user device within the integrated development environment; and
wherein the application is executed on a server accessible from the user device.

18. A system comprising:
at least one processor; and
memory comprising instructions that, when executed by the at least one processor, cause the at least one processor to perform operations comprising:
receiving, from a user device employing an application, a request for information concerning the application;
receiving, from the user device, context information related to execution of the application, the context information comprising information describing an execution environment at the user device during execution of the application;
retrieving, based on the request and the context information, information concerning the application;
transmitting, to the user device, the information concerning the application while the user device is employing the application; and
receiving, from the user device in response to the transmitting of the information to the user device, a second request for information concerning the application for presentation to at least one other user, the second request for information including at least a portion of the context information selected by a user of the user device.

* * * * *